(No Model.) 9 Sheets—Sheet 2.
F. G. NORTON.
SHOE BLACKING MACHINE.

No. 463,164. Patented Nov. 17, 1891.

Fig. 2.

Witnesses:
Lew. E. Curtis
H. W. Munday

Inventor:
Fredrick G. Norton
By Munday, Evarts & Adcock
his Attorneys.

(No Model.)　　　　　　　　　　　　　　9 Sheets—Sheet 4.
F. G. NORTON.
SHOE BLACKING MACHINE.

No. 463,164.　　　　　　　　　Patented Nov. 17, 1891.

Witnesses:　　　　　　　　　　　　　　Inventor:
Sew. E. Curtis　　　　　　　　　　　Fredrick G. Norton
H. W. Munday　　　　　　　　　By Munday Evarts & Adcock
　　　　　　　　　　　　　　　　　　His Attorneys.

(No Model.) 9 Sheets—Sheet 7.
F. G. NORTON.
SHOE BLACKING MACHINE.
No. 463,164. Patented Nov. 17, 1891.

Witnesses: Inventor:
Fredrick G. Norton
By Munday Evarts & Adcock
his Attorneys.

(No Model.) 9 Sheets—Sheet 8.

F. G. NORTON.
SHOE BLACKING MACHINE.

No. 463,164. Patented Nov. 17, 1891.

Witnesses:
Geo. E. Curtis
H. W. Munday

Inventor:
Fredrick G. Norton
By Munday Evarts & Adcock
His Attorneys.

UNITED STATES PATENT OFFICE.

FREDERICK G. NORTON, OF WAUKEGAN, ILLINOIS.

SHOE-BLACKING MACHINE.

SPECIFICATION forming part of Letters Patent No. 463,164, dated November 17, 1891.

Application filed May 5, 1890. Serial No. 350,589. (No model.)

*To all whom it may concern:*

Be it known that I, FREDERICK G. NORTON, a citizen of the United States, residing at Waukegan, in the county of Lake and State of Illinois, have invented a new and useful Improvement in Shoe-Blacking Machines, of which the following is a specification.

This invention relates to improvements in machines for automatically blacking and polishing boots and shoes.

The nature of the invention and the construction of the machine will be fully explained in connection with the drawings, which form a part of this specification, and in which—

Figure 1:
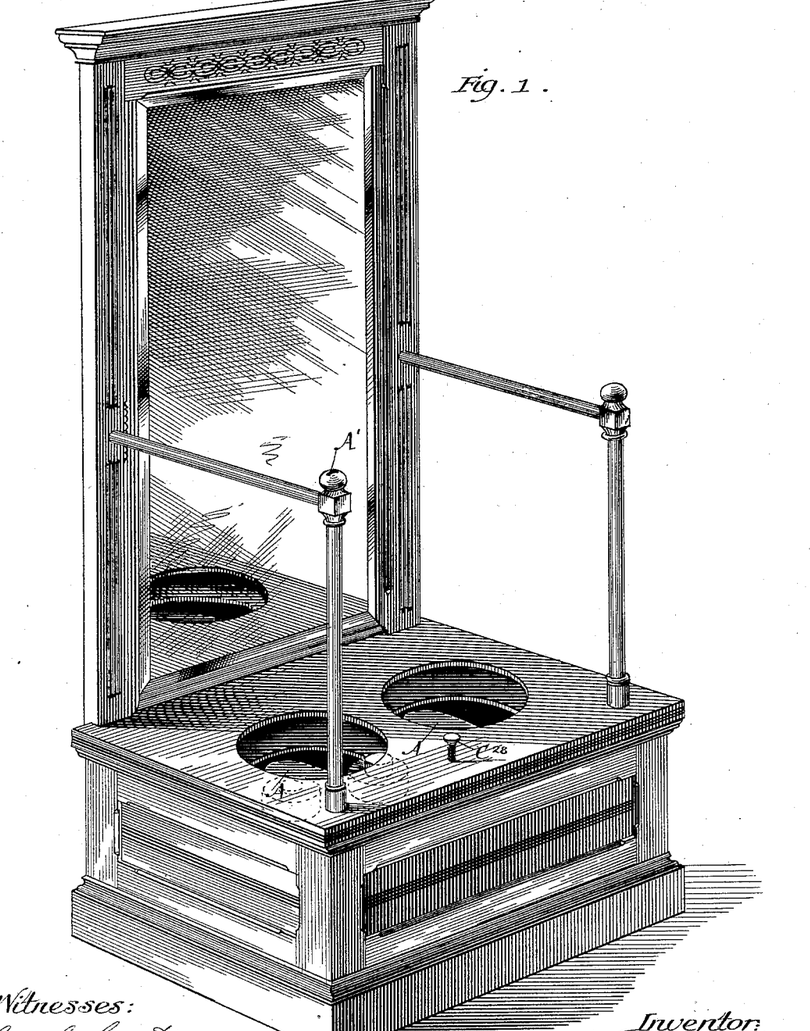
Figure 1 is a perspective view of the exterior of the machine, showing the casing which incloses the mechanism.
Figure 2:
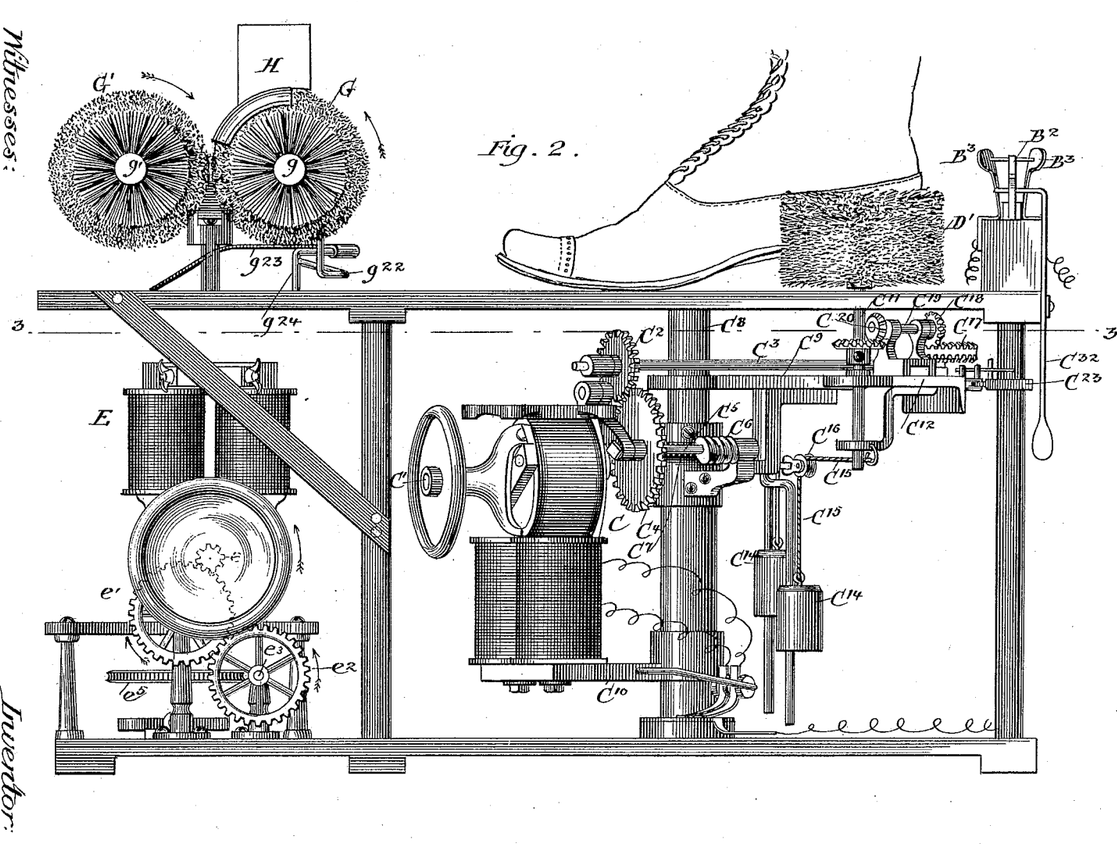
Fig. 2 is a side view of the machinery with the casing removed.

The several figures which illustrate the mechanism exhibit only one-half of the machine—in other words, the blacking and polishing apparatus for one foot. In practice I propose in each machine to duplicate this apparatus, so that both feet may be operated upon simultaneously, and this is indicated at Fig. 1.

The motive power which I prefer to employ in the operation of this machine is electricity, applied as directly as possible by means of one or more electric motors energized, preferably, by a single current, which may be generated in any suitable manner by a battery, a dynamo-electric machine, or by a storage-battery, and I have contrived the machine in such manner that the electric current may be connected or switched by mechanism set in operation by dropping a coin into a slot in the machine.

To avoid repetition, I will now proceed to describe the machine by following its operation, setting forth in conjunction with the operation the construction of the several parts.

Figure 11:
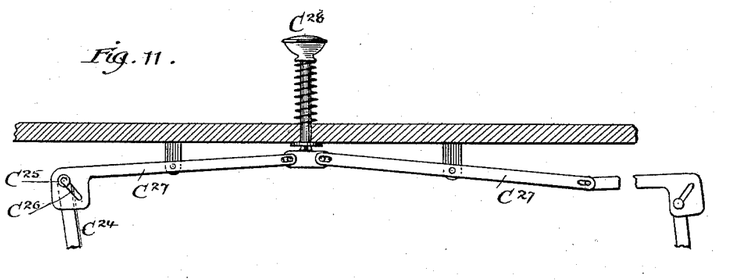
Fig. 11 is a detail of the lever connections for unlatching the machine.
Figure 12:
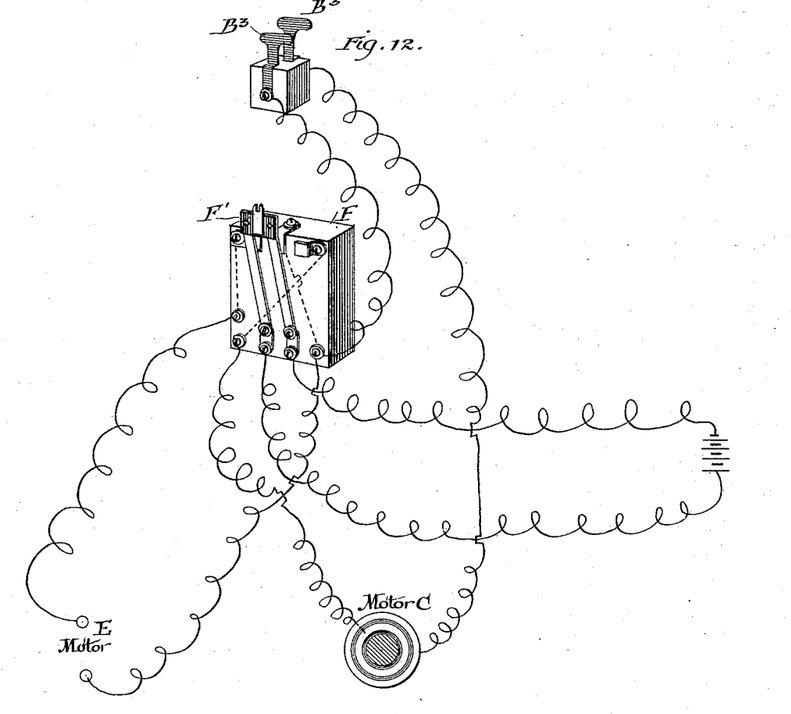
Fig. 12 is a diagram of the electrical circuits.
Figure 13:
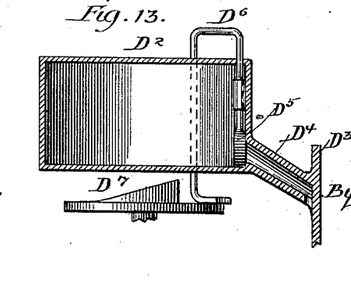
Fig. 13 is a sectional view of the blacking-reservoir.
Figure 14:
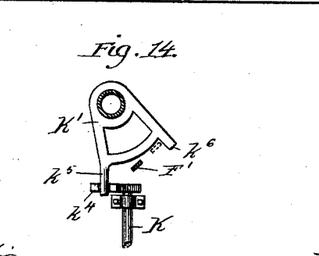
Fig. 14 is a detail view of the switch-returning device.

The person desiring to use the machine having placed his feet one upon each of the supports A, which are mounted upon stationary posts or shafts $C^8$, will drop a coin in the slot A', (see Fig. 1,) which, descending by its own gravity through the chute $A^2$, (see Fig. 6,) will fall upon the receiving plate or stirrup B, attached to the lever B'. The weight of the coin will depress this lever and elevate its other end, which, coming in contact with the arm of a bell-crank lever $B^2$, will throw the latter lever between the two contact-pieces $B^3$. These contact-pieces are arranged in a wedging position to receive the end of the lever $B^2$ or a metallic cross-bar carried thereby. This closes an electric circuit (see Fig. 12) from the source of electrical energy through an electric motor C. The current through the motor C will cause its shaft C' to revolve at a high speed. Geared to this shaft C' by the gear-wheel $C^2$ is a shaft $C^3$, and geared to this latter shaft by the gears $C^3 C^4$ is a shaft $C^5$. Upon the shaft $C^5$ is a worm $C^6$, that engages a rigid worm-wheel $C^7$, mounted concentric with the vertical stationary shaft $C^8$. Upon this vertical shaft is mounted the arm $C^9$, which carries the brushes, and also the framework $C^{10}$, that carries the motor. The action of the screw-pinion $C^6$ upon the fixed worm-wheel $C^7$ is to cause the brushes and the motor to rotate slowly around upon the shaft $C^8$. By this means the brushes are carried around the foot. The brushes, of which there are two, operated by this motor, one for applying the blacking, and lettered D, and the other for polishing, lettered D', are mounted on vertical shafts $C^{11}$, carried by swinging arms $C^{12}$ $C^{13}$, pivoted to the outer end of the arm $C^9$. Weights $C^{14} C^{14}$ are connected to each of the swinging brush-arms $C^{12} C^{13}$ by cords $C^{15}$, which pass over pulleys $C^{16}$, carried on the arm $C^9$. In Figs. 2, 3, 6, and 7 these devices are shown from four points of view. The tendency of these weights, for which, of course, springs may be substituted, is to draw the two brushes in toward the foot with a yielding pressure, which permits them to follow the outlines of the shoe during their rotation around the foot. A rapid planetary rotation over their own axes is given to both of the brushes by means of the shaft $C^3$, which engages the under side of the gear $C^{17}$, the upper side of which meshes with pinions $C^{18}$ on the shafts $C^{19}$, which transmit by pinions $C^{20}$ motion to the brush-carrying shafts $C^{11}$ through the gears $C^{21}$. Although the yielding method of mounting the brushes will readily permit the insertion of the foot upon the support A by crowding the brushes aside, I prefer to provide means for holding or latching the brush D away from the support A, so that said support shall be in part at least unincumbered. For this purpose I provide the spring latch or hook $C^{22}$, which may be hooked into a notch in the arm $C^{13}$, which carries the brush D. This spring latch or hook has a projection $C^{23}$, standing in position to be reached by the end of the vertical lever $C^{24}$. The upper end of this lever carries a pin $C^{25}$, which passes through a diagonal slot $C^{26}$ in the horizontal lever $C^{27}$, which latter lever is linked to the spring-button $C^{28}$, which projects through the casing to the exterior. (See Figs. 1 and 11.) At the time the coin is dropped into the slot, as above described, and after the foot is placed in position upon the support A, the person using the machine will depress the button $C^{28}$, which will throw the lever $C^{24}$ against the projection $C^{23}$ and thus unhook the latch $C^{22}$ and allow the brush D to swing in against the foot. The brush D being the one in advance, is made use of to apply blacking to the shoe. And for this purpose a reservoir $D^2$ (see Figs. 7 and 13) is mounted above the brush, as follows: Attached to the arm $C^{13}$ is an upright standard $D^3$, to which the blacking-can is connected by means of its spout $D^4$. A valve $D^5$, the stem of which $D^6$ is extended through the top of the can and bent around to a point below the can, is opened momentarily at each revolution of the brush by means of a cam $D^7$, carried on the shaft of the brush, and closes by its own weight. The blacking released by the valve flows down upon the face of the standard $D^3$ and is picked up by the brush which revolves in contact therewith and is transferred to the shoe.

Figure 3:
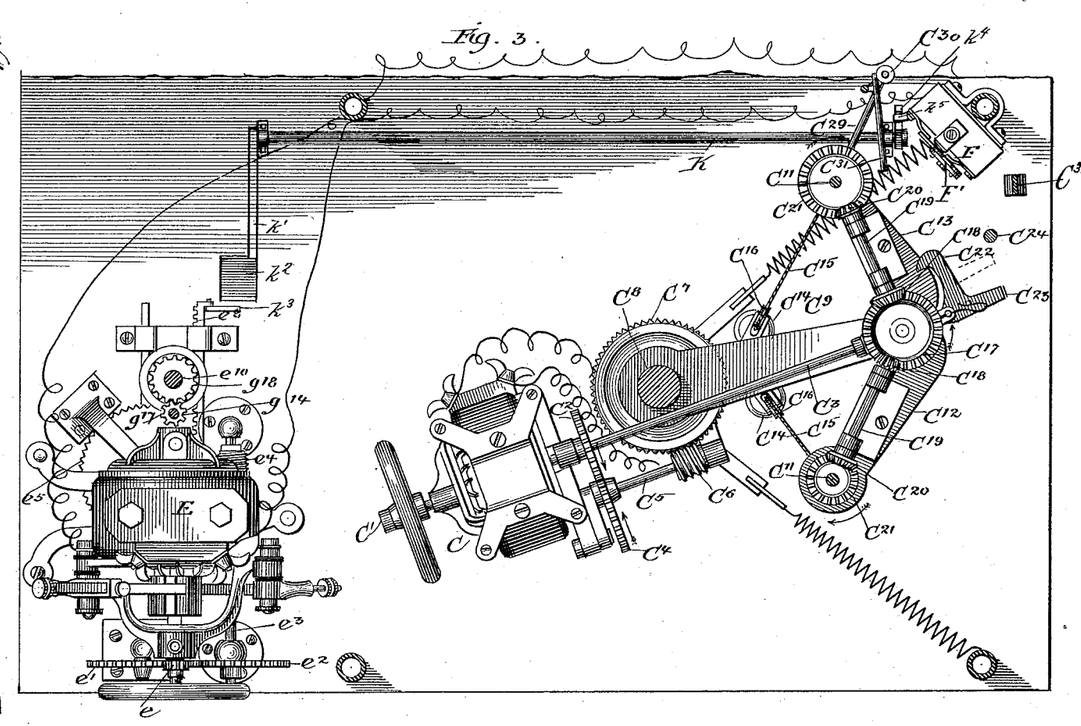
Fig. 3 is a horizontal section of the same, taken on the line 3 3 of Fig. 2.
Figure 6:
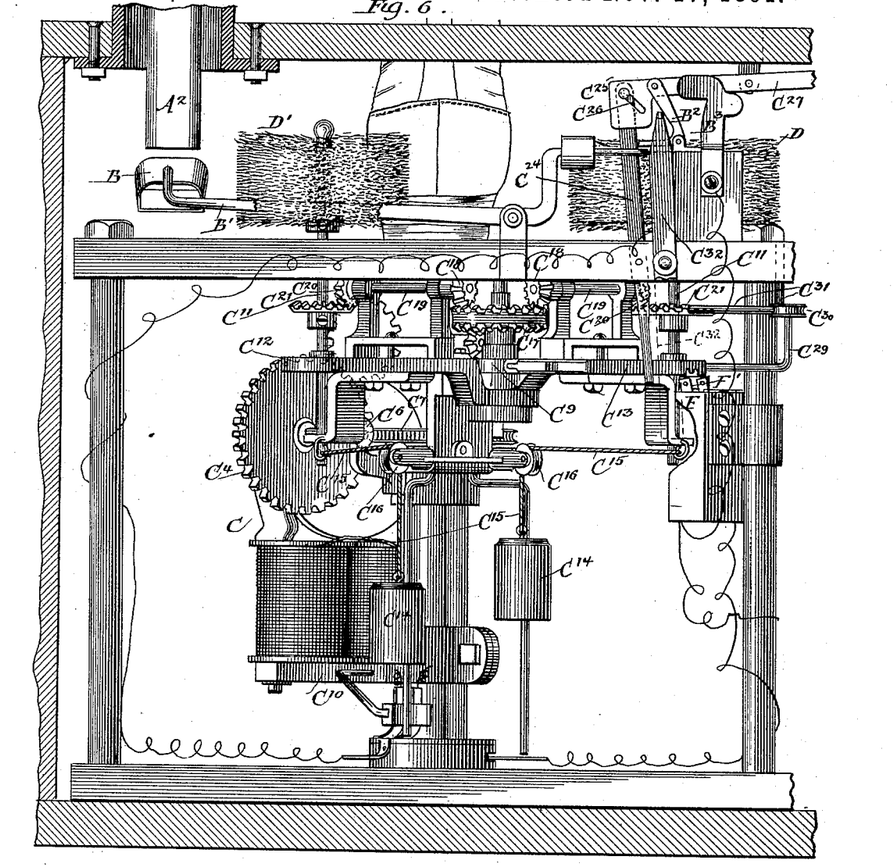
Fig. 6 is an end view from the opposite end to that shown in Fig. 4.
Figure 7:
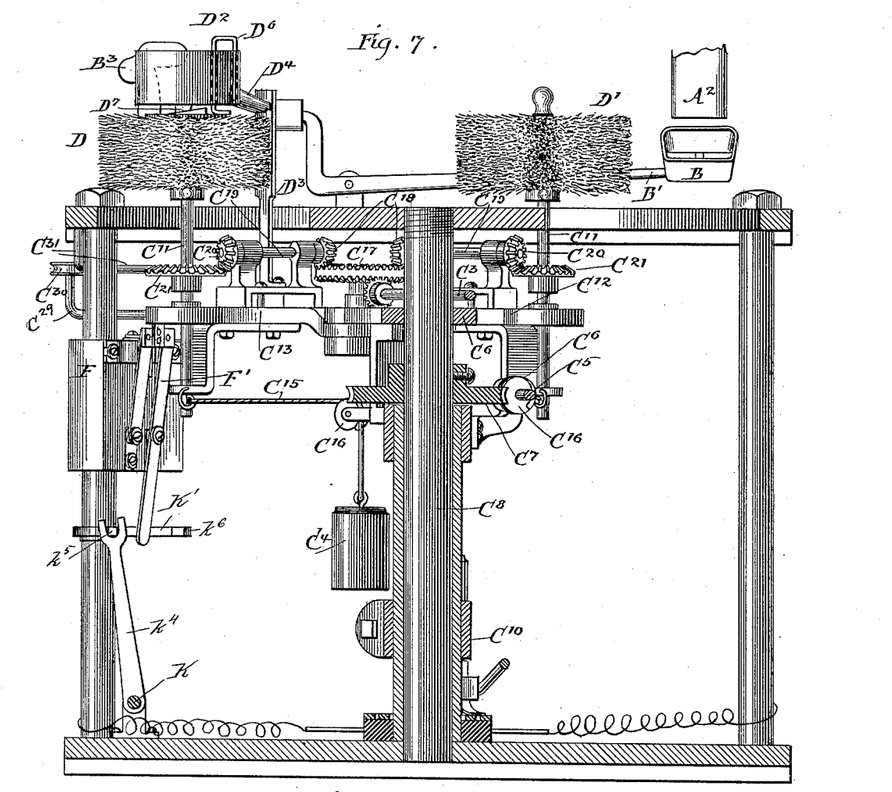
Fig. 7 is a vertical section taken on the line 7 7 of Fig. 5.
Figure 8:
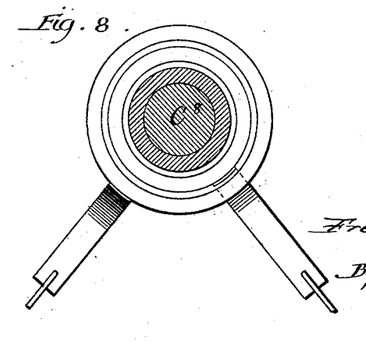
Fig. 8 is a detail view relating to the construction of a portion of Fig. 6.

In order that the polishing-brush D' may pass twice around the shoe without the blacking being applied but once, I provide the support of blacking-brush D with an arm $C^{29}$, carrying a roller $C^{30}$ at the outer end thereof, and located in the path of this roller is a stationary cam-bar $C^{31}$, suspended from the frame of the machine, Figs. 3, 6, and 7. When the blacking-brush D has made one complete revolution around the foot, this roller $C^{30}$ will engage the inner end of the cam-bar $C^{31}$, and in the farther swing of the brush will carry the brush D outward away from the foot until the hook-latch $C^{22}$ has caught the arm $C^{13}$, at which moment the roller $C^{30}$ will ride over the outer end of the cam-bar $C^{31}$ and permit the further revolution of both brushes for another complete circuit of the foot; but now the blacking-brush will be held away from the foot while the polishing-brush is still in contact therewith.

Figure 4:
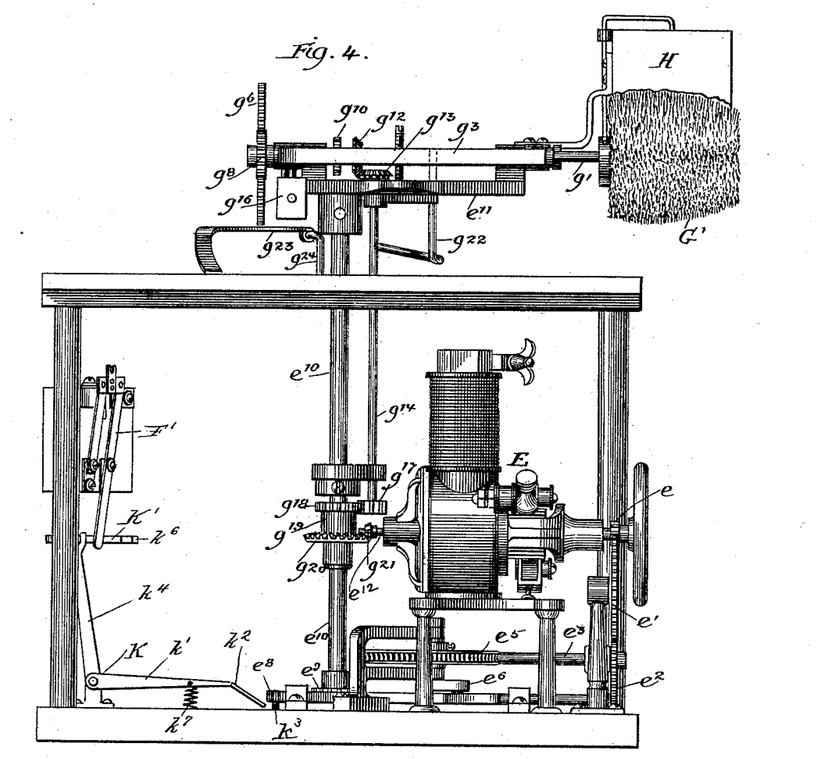
Fig. 4 is an end elevation looking at the machine from the left hand of Fig. 2.
Figure 5:
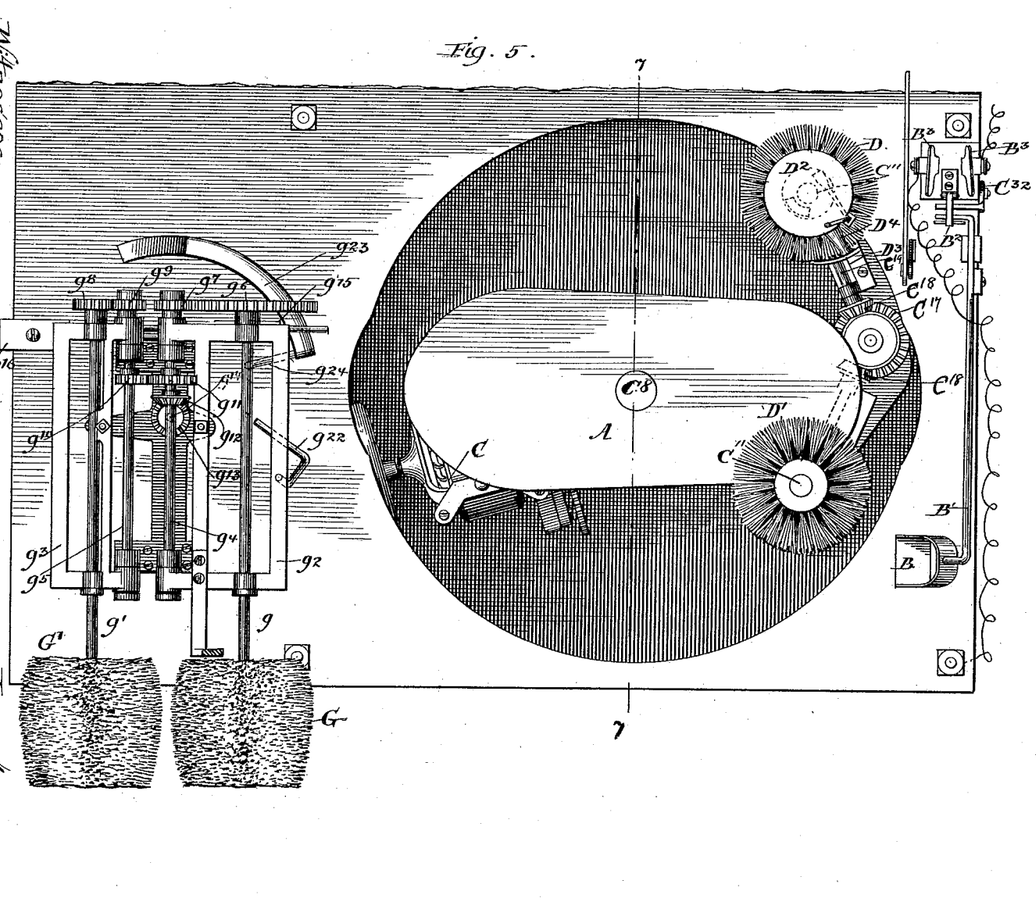
Fig. 5 is a top or plan view of the mechanism.
Figure 9:
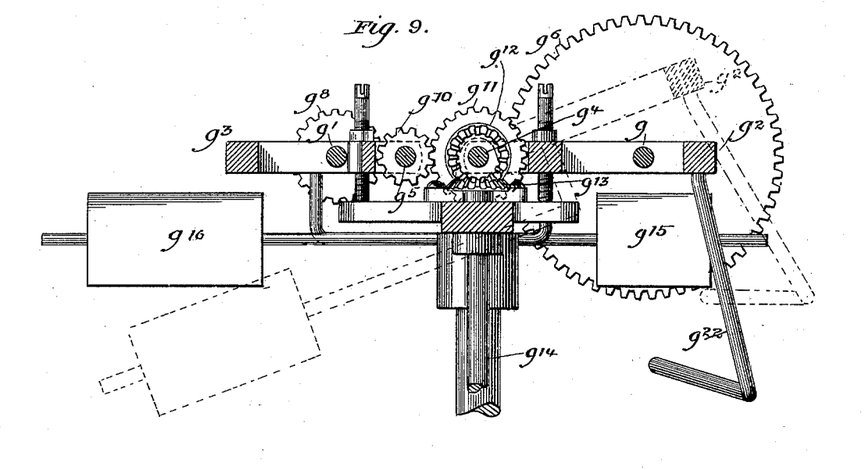
Figs. 9 and 10 are detail views illustrating the construction of the mechanism for operating the toe-brushes.
Figure 10:
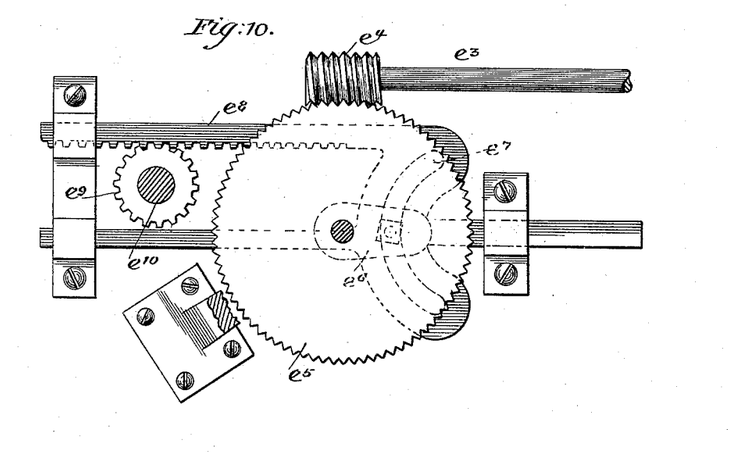

Two revolutions of the polishing-brush I find is generally sufficient to produce the requisite polish, and I provide means, therefore, to cut out the motor C and stop the motion of the brushes at the end of the second revolution. For this purpose I provide the lever $C^{32}$, the lower end of which lies in such position as to be engaged by the arm $C^{29}$ when the brush D is latched in its outermost position. The uppermost end of this lever $C^{32}$ projects in such position that its movement will engage the outer end of the bell-crank lever $B^2$, and striking this lever will carry it back into its first position, removing it from between the contact-pieces $B^3$, and thus breaking the contact and cutting off the current from the motor C, whereupon the mechanism above described will come to a standstill, except for a slight further movement due to its acquired momentum, and which further movement is made use of to shift the current to another pair of brushes that are now to be described. The other pair of brushes I call the "toe-brushes." They are mounted to revolve upon horizontal axes and are operated by a second electric motor E. After the motor C has been cut out, as above described, the remaining momentum of the mechanism carries the brushes a short distance before the swing entirely ceases, and the arm $C^{29}$ during this movement passes over the switch F, moving the double switch-bars F' over into the position shown at Fig. 12, whereby the current is connected through the motor E. Upon the main shaft $e^{12}$ of this motor E is the pinion $e$, which meshes into the gear-wheel $e'$, geared to the wheel $e^2$, the shaft $e^3$ of which carries the screw-pinion $e^4$, which engages with the screw-gear $e^5$, the shaft of which latter gear-wheel carries the crank $e^6$, the wrist-pin of which crank engages a transverse curvilinear slot $e^7$, connected to the rack-bar $e^8$. Geared to this rack-bar is the cog-wheel $e^9$ on the vertical shaft $e^{10}$. Upon the other end of this vertical shaft is mounted a brush-carriage $e^{11}$. Now by tracing back this mechanism it will be seen that the revolution of the motor-shaft imparts to the worm-wheel $e^5$ a slow rotary movement that by the operation of the crank $e^6$ and transverse curvilinear slot $e^7$ is transformed into a reciprocating rectilinear movement, which by the rack $e^8$ and pinion $e^9$ is again changed into a rotary movement of the shaft $e^{10}$, which latter rotary movement of the shaft $e^{10}$ is reversed in one direction and then in the other for a part of a revolution. This results in causing the brush-carriage $e^{11}$ to swing slowly around, carrying the brushes over the toe and back again. These brushes consist of the blacking-brush G and the polishing-brush G', each carried upon a horizontal axis $g$ $g'$, journaled in hinged frames $g^2$ $g^3$, which frames are pivoted concentric with the shafts $g^4$ $g^5$, and in the construction shown are pivoted directly upon said shafts, which lie parallel with the shafts $g$ $g'$. The shaft $g$ is geared to the shaft $g^4$ by the gear-wheels $g^6$ $g^7$, and the shaft $g'$ is geared to the shaft $g^5$ by the gear-wheels $g^8$ $g^9$, and the two shafts $g^4$ $g^5$ are geared together by the gear-wheels $g^{10}$ $g^{11}$. The shaft $g^4$ is furnished with a bevel-gear $g^{12}$, meshing into a bevel-gear $g^{13}$ on the vertical shaft $g^{14}$. The result of this mechanism is that when power is applied to the shaft $g^{14}$ it is transmitted by the gearing to the brushes, causing them to revolve on their axes, while at the same time, by reason of the hinged frames $g^2$ and $g^3$, the brushes are free to rise up and down (see dotted lines in Fig. 9) to a limited extent, to permit them to pass over the foot and follow the contour thereof. Weights $g^{15}$ $g^{16}$, Figs. 4, 5, and 9, adjustably attached to rods and connected, respectively, to the frame $g^2$ and $g^3$, serve to hold the frames and brushes down yieldingly to their work. Rapid motion is communicated to the vertical shaft $g^{14}$ by means of the pinion $g^{17}$, meshing with the gear $g^{18}$, carried on a sleeve $g^{19}$, mounted on the shaft $e^{10}$, which sleeve also carries the bevel-gear $g^{20}$, engaging the pinion $g^{21}$ on the prime shaft $e^{12}$ of the motor E. By this means rapid rotary motion on their own axes is communicated to the brushes. The foremost brush G carries a blacking-can H, similar to the blacking-can $D^2$ already described, which supplies said brush with liquid blacking. In order that this brush G containing the blacking shall not pass in contact with the shoe upon its return swing, there is attached to the frame $g^2$, which carries the brush, a depending projection $g^{22}$, which, in the forward movement of the brush, rides under the stationary latch $g^{23}$, hinged to an upright $g^{24}$ on the frame-work of the machine and in the path of the brush-carriage. Upon its return this projection $g^{22}$ rides up over the latch-cam $g^{23}$, and thus lifts the hinged frame carrying the blacking-brush out of contact with the shoe in its return swing. The polishing-brush G', however, not being effected by this latch-cam, returns in contact with the shoe and finishes polishing the toe. The shoe is now completely blacked and polished on all sides and also over the toe, and it only remains to cut off the current from the motor E by restoring the switch F to its original position—i. e., to the position opposite to that shown in Fig. 12. This I accomplish, Figs. 3, 4, and 7, by means of a crank-shaft K, which has at one end an arm $k'$ provided with an inclined cam-plate $k^2$. On the rack-bar $e^8$ is carried a hinged projection $k^3$, held down in a horizontal position by its own weight, but free to rise. When the rack-bar $e^8$ advances, the hinged projection $k^3$ rides over the incline $k^2$ and drops behind it. In the return movement of the rack-bar $e^8$ the projection $k^3$ will ride under the inclined plate $k^2$ and thereby lift the lever $k'$, thus causing the shaft K to rock. To the other end of the shaft K is connected an upright arm $k^4$, the upper end of which by a fork engages a pin $k^5$ on the quadrant K'. This quadrant K' is pivoted immediately below the switch, which carries the upright which supports the switch. A projection $k^6$ on the quadrant is in position such that when the shaft K is rocked in one direction by the return movement of the rack-bar $e^8$, it will engage a continuation of the switch-lever and throw the switch back to its original position. Having accomplished this work, the spring $k^7$ will operate to pull the lever $k'$ down again to its normal position, ready for another operation. Upon the circuit being thus cut off from the motor E, the whole mechanism comes to a standstill, and is in position for renewal of the above operation, as before detailed, upon the dropping of another coin into the slot and the depression of the knob $c^{28}$.

In a brief recapitulation of the operation of the machine it will be seen that the shoes upon both feet of the person using the machine and depositing the coin in the slot will be blacked and polished, first by a pair of brushes, which go entirely around the shoe from toe to heel twice, the first time blacking and polishing and the second time polishing only, and that the toes of the shoes will be then blacked and polished by a pair of brushes which pass over the toes in one direction and return in the other, blacking and polishing in the first passage and polishing only in the last. By this operation the shoes are thoroughly polished in an exceedingly short space of time, as the motion of the brushes in rotation on their own axes can be very rapid, while their movement around and over the shoe is comparatively slow, and hence a large amount of the necessary brush action is attained.

I claim—

1. The combination, in a shoe-blacking machine, of a pair of brushes mounted yieldingly upon a crank-arm on vertical axes, said crank-arm being carried by a shaft, and an electric motor geared to the shaft and imparting motion to said shaft in a rotary direction to carry the brushes around the foot and geared to the brushes to impart a more rapid rotary motion on their own axes to produce the blacking and polishing, substantially as set forth.

2. In a shoe-blacking machine, the pair of brushes mounted on hinged arms connected to a vertical shaft, in combination with an electric motor carried by the same shaft and geared thereto by worm and screw pinions to cause the brushes to travel around them with a slow motion, and geared also to the brushes to cause the brushes to rotate on their own axes with a more rapid movement, substantially as specified.

3. In a shoe-blacking machine, the pair of brushes mounted on hinged arms connected to a vertical shaft, in combination with an electric motor carried by the same shaft and geared thereto by worm and screw pinions to cause the brushes to travel around them with a slow motion, and geared also to the brushes to cause the brushes to rotate on their own axes with a more rapid movement, one of said brushes being adapted to be locked out of contact with the foot by means of a spring-latch, substantially as specified.

4. In a shoe-blacking machine, the pair of brushes mounted on hinged arms connected to a vertical shaft, in combination with an electric motor carried by the same shaft and geared thereto by worm and screw pinions to cause the brushes to travel around them with a slow motion, and geared also to the brushes to cause the brushes to rotate on their own axes with a more rapid movement, one of said brushes being adapted to be locked out of contact with the foot by means of a spring-latch, in combination with a device for throwing the foremost or blacking brush out of contact with the foot on its second round, to be retained by a spring-latch in this position, substantially as specified.

5. In a shoe-blacking machine, the pair of brushes mounted on hinged arms connected to a vertical shaft, in combination with an electric motor carried by the same shaft and geared thereto by worm and screw pinions to cause the brushes to travel around them with a slow motion, and geared also to the brushes to cause the brushes to rotate on their own axes with a more rapid movement, one of said brushes being adapted to be locked out of contact with the foot by means of a spring-latch, in combination with a device for throwing the foremost or blacking brush out of contact with the foot on its second round, to be retained by a spring-latch in this position, and a lever projecting to the outside of the casing of the machine for unlatching said latch to permit the blacking-brush to swing into contact with the foot, substantially as specified.

6. In combination, the pair of brushes mounted on vertical axes and traveling around the foot, being operated by an electric motor, the second pair of brushes for traveling over the toe, being operated by an independent electric motor, and the switch F for changing the current from the first motor to the second, operated by the first pair of brushes at the close of their circuit, substantially as specified.

7. The pair of toe-brushes mounted on horizontal axes on hinged frames, held down yieldingly and carried on a swinging carriage operated by an electric motor geared to swing the carriage around and back slowly and rotate the brushes rapidly, substantially as specified.

8. The pair of toe-brushes mounted on horizontal axes on hinged frames, held down yieldingly and carried on a swinging carriage operated by an electric motor geared to swing the carriage around and back slowly and rotate the brushes rapidly, the foremost brush being provided with a blacking-reservoir to supply it with liquid blacking, substantially as specified.

9. The pair of toe-brushes mounted on horizontal axes on hinged frames, held down yieldingly and carried on a swinging carriage operated by an electric motor geared to swing the carriage around and back slowly and rotate the brushes rapidly, the foremost brush being provided with a blacking-reservoir to supply it with liquid blacking, and means for lifting the blacking-brush on its return swing from the foot, substantially as specified.

10. The pair of toe-brushes mounted on horizontal axes on hinged frames, held down yieldingly and carried on a swinging carriage operated by an electric motor geared to swing the carriage around and back slowly and rotate the brushes rapidly, the foremost brush being provided with a blacking-reservoir to supply it with liquid blacking, and means for lifting the blacking-brush on its return swing from the foot, such means consisting of a latch-cam carried on the frame of the machine, substantially as specified.

11. As a means for imparting reciprocating swinging motion to the brush-carriage, the worm-gearing $E^4$ $E^5$, the crank $E^6$, the slotted rack-bar $E^7$ $E^8$, and the pinion and shaft $E^9$ $E^{10}$, substantially as specified.

12. The combination of the electric motor E, the gearing $e$ $e'$ $e^2$ $e^3$ $e^4$ $e^5$, crank $e^6$, slotted rack-bar $e^7$ $e^8$, gear $e^9$, shaft $e^{10}$, the frame $e^{11}$, together with gearing $g^{21}$ $g^{20}$ $g^{18}$ $g^{17}$ $g^{14}$, and gearing connecting therewith from the parallel brush-shafts, together with the brushes mounted thereon, substantially as specified.

13. The combination of a brush, a movable support therefor, an electric motor connected with said support and with said brush for actuating the same, a coin-receptacle, and mechanism controlling the electric circuit of the motor, and a switch situated in the path of said brush-support, substantially as set forth.

FREDERICK G. NORTON.

Witnesses:
CHAS. WHITNEY,
H. C. UPTON.